US012752636B2

(12) United States Patent
Kaneko et al.

(10) Patent No.: US 12,752,636 B2
(45) Date of Patent: Oct. 6, 2026

(54) BATTERY ELECTRIC VEHICLE AND CONTROL DEVICE

(71) Applicant: TOYOTA JIDOSHA KABUSHIKI KAISHA, Toyota (JP)

(72) Inventors: Satoshi Kaneko, Gotemba (JP); Kazuki Fujii, Hadano (JP); Norimi Asahara, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 16 days.

(21) Appl. No.: 18/973,555

(22) Filed: Dec. 9, 2024

(65) Prior Publication Data

US 2025/0262946 A1 Aug. 21, 2025

(30) Foreign Application Priority Data

Feb. 21, 2024 (JP) ................................ 2024-024658

(51) Int. Cl.
*B60L 15/20* (2006.01)

(52) U.S. Cl.
CPC ........... *B60L 15/20* (2013.01); *B60L 2240/14* (2013.01)

(58) Field of Classification Search
CPC ............................. B60L 2240/14; B60L 15/20
USPC ............................................................ 701/22
See application file for complete search history.

(56) References Cited

U.S. PATENT DOCUMENTS

2014/0277879 A1* 9/2014 Sheidler ................ B60W 10/26 180/65.265
2019/0118815 A1* 4/2019 Jordan, III ............. B60K 35/60
2021/0070286 A1* 3/2021 Green .................... G06V 10/25
2021/0188125 A1* 6/2021 Zhao ................... H01M 10/486
2021/0229550 A1* 7/2021 Isami .................. B60L 15/2054
2022/0084497 A1* 3/2022 Oh ......................... G10K 15/02
2023/0094310 A1* 3/2023 Zhao ....................... B60L 58/14 701/22
2023/0191917 A1* 6/2023 Borretti ..................... B60L 3/04 701/22
2023/0322094 A1* 10/2023 van Nus ................ B60L 15/20 701/22
2024/0123994 A1* 4/2024 Hancock ......... B60W 30/18172

FOREIGN PATENT DOCUMENTS

JP 6787507 B1 11/2020

* cited by examiner

*Primary Examiner* — Yazan A Soofi
(74) *Attorney, Agent, or Firm* — SoraIP, Inc.

(57) ABSTRACT

Battery electric vehicle includes a processing circuit and a storage device. The storage device stores a database that manages a plurality of vehicle models modeled on a plurality of virtual vehicles. The processing circuit reads the target vehicle model corresponding to the target virtual vehicle selected by the driver from the database. In addition, the processing circuitry sets a coefficient of 1 or less in accordance with the acceleration characteristic of the target virtual vehicle, multiplies the vehicle speed of battery electric vehicle by the inverse of the set coefficient, and calculates the adjusted vehicle speed. Further, the processing circuit calculates the virtual acceleration of the target virtual vehicle using the target vehicle model, and calculates the adjusted virtual acceleration by multiplying the virtual acceleration by the set coefficient. The processing circuit then controls the electric motor to adjust the acceleration of battery electric vehicle to the adjusted virtual acceleration.

7 Claims, 10 Drawing Sheets

BATTERY ELECTRIC VEHICLE AND CONTROL DEVICE

CROSS-REFERENCE TO RELATED APPLICATION

This application claims priority to Japanese Patent Application No. 2024-024658 filed on Feb. 21, 2024, incorporated herein by reference in its entirety.

BACKGROUND

1. Technical Field

The present disclosure relates to battery electric vehicles including an electric motor as a driving source.

2. Description of Related Art

The electric motor can be controlled to output a desired motor torque by controlling a voltage or field to be applied. There have been conceived technologies for reproducing various driving feelings in a battery electric vehicle by controlling the electric motor of the battery electric vehicle as appropriate using this fact. For example, Japanese Patent No. 6787507 (JP 6787507 B) discloses a technology for simulating, in a battery electric vehicle, driving feelings associated with manual shift operations of a manual transmission vehicle.

SUMMARY

One element that characterizes the driving feelings of each vehicle is an acceleration feeling of the vehicle in response to a driving operation. The acceleration feeling of the vehicle is an important point for the driver to enjoy driving the vehicle. In particular, the preference for the acceleration feeling of the vehicle varies from driver to driver. The driver may also desire to enjoy the acceleration feelings of various vehicles depending on the mood.

Therefore, the inventors related to the present disclosure have studied a technology of calculating a virtual acceleration when a virtual vehicle is driven using a vehicle model and controlling an electric motor to realize the calculated virtual acceleration in a battery electric vehicle. The vehicle model may be provided for a plurality of virtual vehicles. With this technology, it is possible to simulate the acceleration feelings of the virtual vehicles in one battery electric vehicle.

However, the accelerations that can be realized by the battery electric vehicle are, as a matter of course, limited in relation to power characteristics of the motor torque of the electric motor of the battery electric vehicle. For this reason, for virtual vehicles having acceleration characteristics exceeding the acceleration capability of the battery electric vehicle, the acceleration characteristics cannot be realized as they are in the battery electric vehicle. As a result, there is a problem that the acceleration feelings of such virtual vehicles cannot be reproduced in the battery electric vehicle. Increasing the acceleration capability of the battery electric vehicle to realize the acceleration characteristics of the virtual vehicles causes an unnecessary increase in costs of the battery electric vehicle.

An object of the present disclosure is to provide a battery electric vehicle capable of reproducing an acceleration feeling of a virtual vehicle having an acceleration characteristic exceeding the acceleration capability of the battery electric vehicle.

A first aspect of the present disclosure relates to a battery electric vehicle including an electric motor as a driving source.

The battery electric vehicle includes:

- a driving operation member to be used for driving the battery electric vehicle;
- a processing circuit; and
- a storage device.

The storage device is configured to store a database for managing a plurality of vehicle models for a plurality of virtual vehicles having different acceleration characteristics for a driving operation by a driver.

The processing circuit is configured to

- read, from the database, a target vehicle model associated with a target virtual vehicle selected from among the plurality of virtual vehicles by the driver.

The processing circuit is configured to set a coefficient that is a value of 1 or less according to the acceleration characteristic of the target virtual vehicle.

The processing circuit is configured to calculate an adjusted vehicle speed by multiplying a vehicle speed of the battery electric vehicle by an inverse of the set coefficient.

The processing circuit is configured to calculate a virtual acceleration of the target virtual vehicle in response to an operation on the driving operation member using the target vehicle model based on an operation state of the driving operation member and the adjusted vehicle speed.

The processing circuit is configured to calculate an adjusted virtual acceleration by multiplying the calculated virtual acceleration by the set coefficient.

The processing circuit is configured to control the electric motor to bring an acceleration of the battery electric vehicle to the adjusted virtual acceleration.

A second aspect of the present disclosure relates to a control device for a battery electric vehicle including an electric motor as a driving source.

The battery electric vehicle includes a driving operation member to be used for driving the battery electric vehicle.

The control device includes:

- a processing circuit; and
- a storage device.

The storage device is configured to store a database for managing a plurality of vehicle models for a plurality of virtual vehicles having different acceleration characteristics for a driving operation by a driver.

The processing circuit is configured to read, from the database, a target vehicle model associated with a target virtual vehicle selected from among the plurality of virtual vehicles by the driver.

The processing circuit is configured to set a coefficient that is a value of 1 or less according to the acceleration characteristic of the target virtual vehicle.

The processing circuit is configured to calculate an adjusted vehicle speed by multiplying a vehicle speed of the battery electric vehicle by an inverse of the set coefficient.

The processing circuit is configured to calculate a virtual acceleration of the target virtual vehicle in response to an operation on the driving operation member using the target vehicle model based on an operation state of the driving operation member and the adjusted vehicle speed.

The processing circuit is configured to calculate an adjusted virtual acceleration by multiplying the calculated virtual acceleration by the set coefficient.

The processing circuit is configured to control the electric motor to bring an acceleration of the battery electric vehicle to the adjusted virtual acceleration.

According to the present disclosure, the coefficient that is the value of 1 or less is set according to the acceleration characteristic of the target virtual vehicle, and the adjusted virtual acceleration is calculated by multiplying the virtual acceleration of the target virtual vehicle by the set coefficient. Then, the electric motor is controlled to bring the acceleration of the battery electric vehicle to the adjusted virtual acceleration. The acceleration characteristic of the target virtual vehicle may exceed the acceleration capability of the battery electric vehicle. Also in this case, it is possible to realize an acceleration characteristic that can reproduce the acceleration feeling of the target virtual vehicle within the range of the acceleration capability of the battery electric vehicle. In this way, according to the present disclosure, it is possible to reproduce the acceleration feeling of the virtual vehicle having the acceleration characteristic exceeding the acceleration capability of the battery electric vehicle.

Further, according to the present disclosure, the adjusted vehicle speed is calculated by multiplying the vehicle speed of the battery electric vehicle by the inverse of the set coefficient. Then, the virtual acceleration is calculated using the vehicle model of the target virtual vehicle (target vehicle model) based on the adjusted vehicle speed instead of the vehicle speed of the battery electric vehicle. Accordingly, it is possible to improve the calculation accuracy in the target vehicle model. As a result, it is possible to realize an acceleration characteristic that reproduces the acceleration feeling of the virtual vehicle more faithfully.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
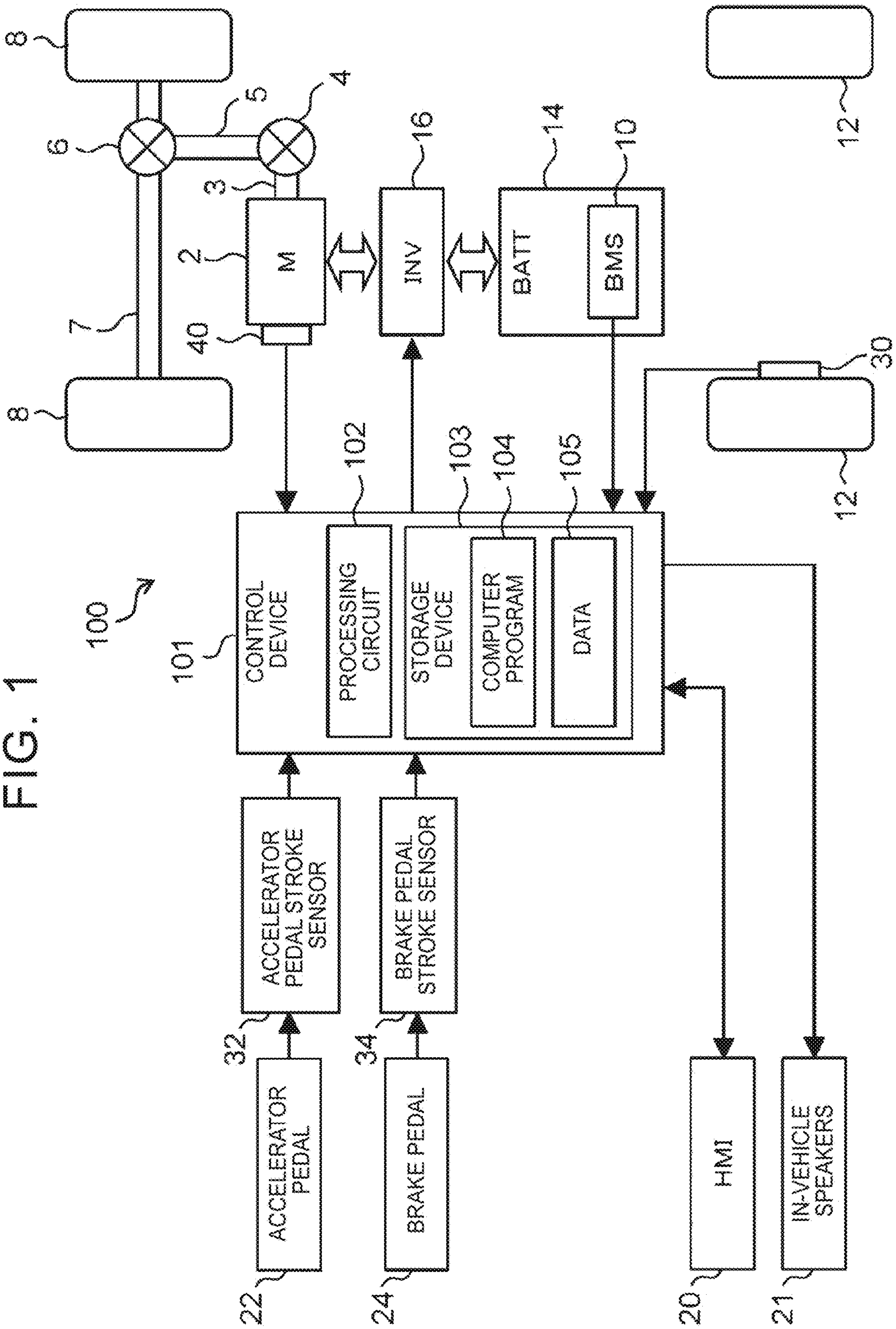
FIG. 1 is a diagram illustrating a configuration of a battery electric vehicle according to an embodiment.

Hereinafter, embodiments of the present disclosure will be described with reference to the drawings. In the drawings, the same or corresponding parts are denoted by the same reference numerals, and the description thereof is simplified or omitted.

1 Configuration of Battery Electric Vehicle Power System

FIG. 1 is a diagram schematically illustrating a configuration of a battery electric vehicle 100 according to an embodiment of the present disclosure. First, referring to FIG. 1, a configuration of a power system of a battery electric vehicle 100 will be described.

Battery electric vehicle 100 includes an electric motor (M) 2 as a driving source for traveling. The electric motor 2 is, for example, a three-phase AC motor. An output shaft 3 of the electric motor 2 is connected to one end of a propeller shaft 5 via a gear mechanism 4. The other end of the propeller shaft 5 is connected to a drive shaft 7 in front of the vehicle via a differential gear 6.

Battery electric vehicle 100 comprises drive wheels 8, which are front wheels, and dependent wheels 12, which are rear wheels. The drive wheels 8 are respectively provided at both ends of the drive shaft 7.

Battery electric vehicle 100 includes a battery (BATT) 14 and inverters (INV) 16. The battery 14 stores electric energy for driving the electric motor 2. That is, battery electric vehicle 100 is a battery electric vehicle (BEV) that runs on the electric power stored in the battery 14. The inverter 16 is, for example, a voltage type inverter. The inverter 16 controls the motor torque outputted from the electric motor 2 by PWM control.

2 Configuration of Battery Electric Vehicle Control System

Referring to FIG. 1, the configuration of the control system of battery electric vehicle 100 will be described.

Battery electric vehicle 100 includes a vehicle speed sensor 30 for detecting a vehicle speed. At least one wheel speed sensor (not shown) provided on each of the left and right front wheels 8 and the left and right rear wheels 12 is used as the vehicle speed sensor 30. The vehicle speed is one of the driving conditions of battery electric vehicle 100. Battery electric vehicle 100 may further comprise sensors for detecting driving conditions of another battery electric vehicle 100, such as yaw rates, attitudes, and ambient conditions.

Battery electric vehicle 100 includes an accelerator pedal stroke sensor 32. The accelerator pedal stroke sensor 32 is provided on the accelerator pedal 22 and outputs a signal indicating an operation state of the accelerator pedal 22. The operating state of the accelerator pedal typically includes an accelerator operation amount and an accelerator opening speed. Battery electric vehicle 100 also includes a brake pedal stroke sensor 34. The brake pedal stroke sensor 34 is provided on the brake pedal 24 and outputs a signal indicating an operation state of the brake pedal 24. The operating state of the brake pedal 24 typically includes a brake opening degree and a brake opening speed.

The accelerator pedal 22 and the brake pedal 24 are each one of the driving operation members used for driving battery electric vehicle 100. In addition, battery electric vehicle 100 may include various driving operation members such as steering wheels for driving related to steering.

Battery electric vehicle 100 includes a rotational speed sensor 40. The rotational speed sensor 40 is provided in the electric motor 2 and outputs a signal indicating the rotation speed of the electric motor 2.

Battery electric vehicle 100 comprises a battery management system (BMS) 10. The battery management system 10 is a device that monitors the cell voltage, current, temperature, and the like of the battery 14. The battery management system 10 has a function of estimating a state-of-charge (SOC) of the battery 14.

Battery electric vehicle 100 includes a Human Machine Interface (HMI) 20 as an interface with the driver and an in-vehicle speaker 21. HMI 20 presents various types of information to the driver by displaying or sounding, and receives various types of input from the driver. HMI 20 includes a display (e.g., a multi-information display, a meter display), a switch, a touch pad, a speakerphone, a touch screen, and the like. For example, HMI 20 displays various types of information on the display and receives an input from the driver on the display content by operating the switch. Further, for example, HMI 20 displays various types of information on the touch screen, and receives an input from the driver on the display content by a touch operation on the touch screen. The in-vehicle speaker 21 is a sound generator that artificially generates sound in the vehicle cabin. In particular, the in-vehicle speaker 21 can output a pseudo engine sound to be described later. The in-vehicle speaker 21 may be configured as a part of HMI 20.

Battery electric vehicle 100 includes a control device 101. Various sensors mounted on battery electric vehicle 100 and devices to be controlled are connected to the control device 101 through an in-vehicle network such as a Controller Area Network (CAN). In addition to the vehicle speed sensor 30, the accelerator pedal stroke sensor 32, the brake pedal stroke sensor 34, and the rotational speed sensor 40, various sensors are mounted on battery electric vehicle 100. The sensor may be connected to the control device 101 via an in-vehicle network.

The control device 101 generates control signals related to various types of control of battery electric vehicle 100 based on signals acquired from the respective sensors. The control device 101 is typically an electronic control unit (ECU). The control device 101 may be a combination of a plurality of ECU. The control device 101 includes at least a processing circuit 102 and a storage device 103.

The processing circuit 102 executes various kinds of processing. Processing circuitry 102 may comprise, for example, a general-purpose processor, an application-specific processor, a Central Processing Unit (CPU), Graphics Processing Unit (GPU), Application Specific Integrated Circuit (ASIC), Field-Programmable Gate Array (FPGA), integrated circuitry, conventional circuitry, and combinations of one or more thereof. A processor including transistors and other circuits is an example of the processing circuit 102. Processing circuitry 102 may also be referred to as a circuitry or a processing circuitry. Circuitry is hardware programmed to implement the functions described herein, or hardware executing the functions.

The storage device 103 stores various kinds of information necessary for executing the processing of the processing circuit 102. The storage device 103 is constituted by a recording medium such as Random Access Memory (RAM), Read Only Memory (ROM), Solid State Drive (SSD), Hard Disk Drive (HDD), and the like. The storage device 103 stores a computer program 104 executable by the processing circuit 102 and various types of data 105. The computer program 104 includes a plurality of instructions describing processing to be executed by the processing circuit 102. The computer program 104 may be recorded in a computer-readable recording medium. The functions of the control device 101 are realized by the cooperation of the processing circuit 102 for executing the computer program 104 and the storage device 103.

The control device 101 according to the present embodiment has at least two control modes, i.e., a normal mode and an on-demand mode, for controlling battery electric vehicle 100. The control of battery electric vehicle 100 executed by the control device 101 changes according to the selected control mode. The control mode of battery electric vehicle 100 will be described below.

3 Battery Electric Vehicle Control Mode

As described above, there are at least two control modes of battery electric vehicle 100: the normal mode and the on-demand mode. The normal mode is a control mode in which battery electric vehicle 100 is operated as a normal BEV. When the normal mode is selected, the control device 101 controls battery electric vehicle 100 so as to operate as a normal BEV. On the other hand, the on-demand mode is a control mode in which an acceleration feeling of a virtual vehicle (hereinafter referred to as "target virtual vehicle") selected by a driver from among a plurality of virtual vehicles is reproduced by a battery electric vehicle 100. When the on-demand mode is selected, the control device 101 controls battery electric vehicle 100 so as to obtain an acceleration feeling that the driver is driving the target virtual vehicles. Various types of control of battery electric vehicle 100 in each of the normal mode and the on-demand mode will be described later.

In the on-demand mode, the plurality of virtual vehicles include various vehicles having different acceleration characteristics with respect to the driving operation of the driver. Each virtual vehicle may be assumed to be a real vehicle, or may be assumed to be a vehicle that does not actually exist. The difference in the acceleration characteristics is generally caused by the difference in the configuration of the powertrain from the drive source to the drive wheels and the difference in the control method of the powertrain. Therefore, the plurality of virtual vehicles may be considered to include various vehicles in which at least some of the components of the configuration and the control method related to the powertrain are different.

The control mode is selected by the driver operating HMI 20. HMI 20 is configured to receive a control-mode selection from a driver. Further, HMI 20 is configured to receive a selection of the target virtual vehicles from the driver in relation to the on-demand mode.

Figure 2:
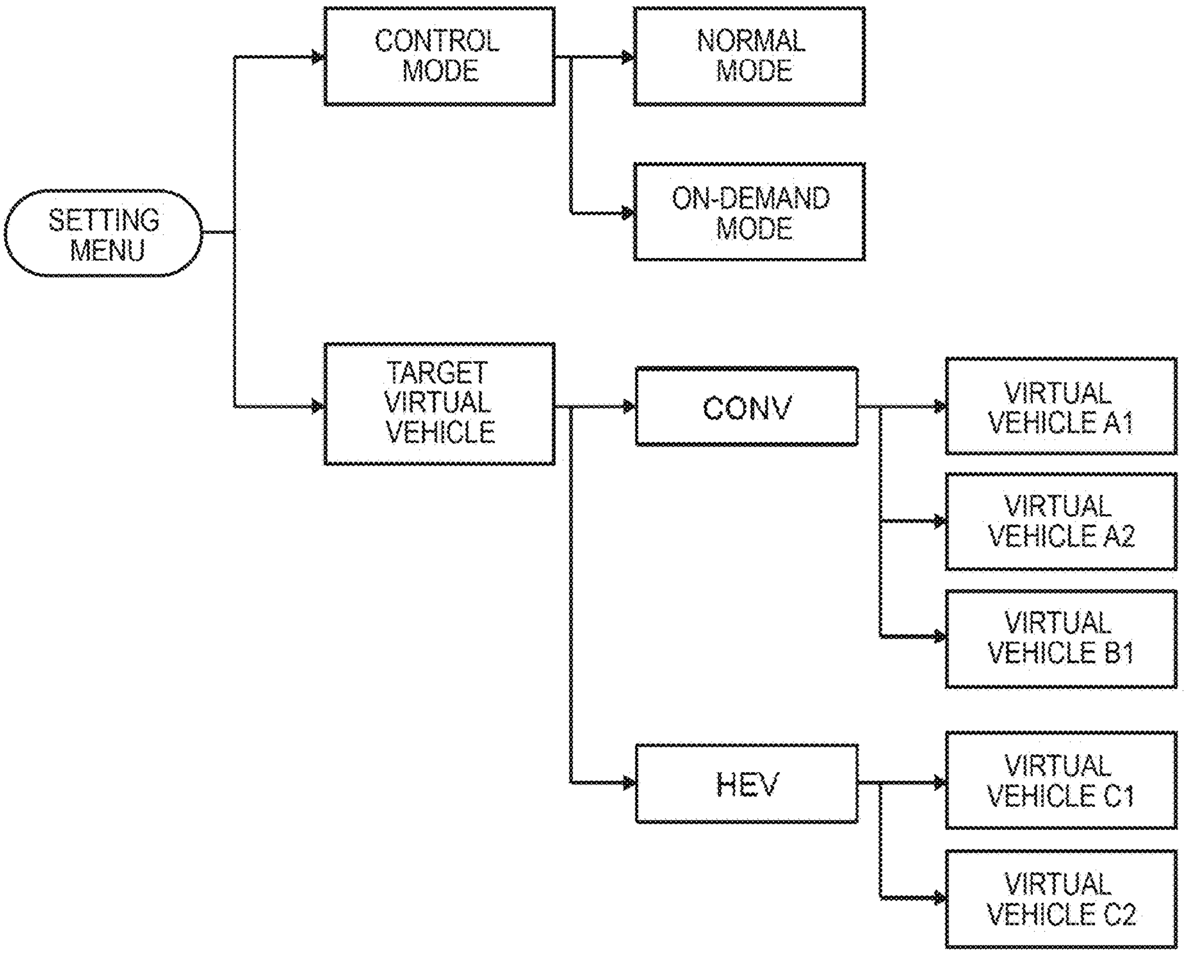
FIG. 2 is a tree diagram illustrating an exemplary selection input accepted by a HMI with respect to the control mode of battery electric vehicle according to the embodiment.

FIG. 2 is a tree diagram illustrating an exemplary selection input accepted by HMI 20. For example, HMI 20 receives a selection from the driver through a display or a touch screen according to the tree shown in FIG. 2 as follows.

First, HMI 20 displays a setting menu screen on a display or a touch screen according to a driver's manipulation. On the initial screen of the setting menu screen, an option "control mode" and an option "target virtual vehicle" are displayed. The option "control mode" is an option for accepting a selection input of the control mode from the driver. The option "target virtual vehicle" is an option for accepting a selection input of the target virtual vehicle from the driver.

When the option "control mode" is selected, the selection "normal mode" and the selection "on-demand mode" are displayed on the setting menu screen. When the option "normal mode" is selected, HMI 20 determines that battery electric vehicle 100 control mode is the normal mode. When the option "on-demand mode" is selected, HMI 20 determines that the control mode of battery electric vehicle 100 is the on-demand mode. In this way, HMI 20 receives a control-mode selection from the driver.

On the other hand, when the option "on-demand mode" is selected, the selection "CONV" and the selection "HEV" are displayed on the setting menu screen. The choices "CONV" and "HEV" respectively indicate the categories of the plurality of virtual vehicles that can be selected in the on-demand mode. CONV is a category indicating a conventional vehicle. HEV is a category indicating hybrid electric vehicle. When the option "CONV" is selected, the selection "virtual vehicle A1", the selection "virtual vehicle A2", and the selection "virtual vehicle B1" are displayed in the setting menu. The virtual vehicle A1, the virtual vehicle A2, and the virtual vehicle B1 are virtual vehicles classified into CONV among a plurality of selectable virtual vehicles. Similarly, when the option "HEV" is selected, the selection "virtual vehicle C1" and "virtual vehicle C2" are next displayed on the setting menu. The virtual vehicle C1 and the virtual vehicle C2 are virtual vehicles classified into HEV among a plurality of selectable virtual vehicles. If any of these options is selected, HMI 20 determines the corresponding virtual vehicle as the target virtual vehicle. For example, if the option "virtual vehicle A2" is selected, HMI 20 determines that the virtual vehicle A2 is the target virtual vehicle. In this way, HMI 20 receives a selection of the target virtual vehicles from the driver.

In the above description, the classification of the plurality of virtual vehicles is an example, and the options related to the classification may be changed as appropriate. For example, the categorization option may further include an option indicating a plug-in hybrid electric vehicle or a fuel cell electric vehicle. Further, for example, the classification option may indicate another classification such as a classification related to a type of an internal combustion engine (e.g., an in-line-four supercharged engine, a flat-six engine, or a V12 engine) to be mounted. Alternatively, when the option "on-demand mode" is selected, the option related to the virtual vehicle may be displayed without displaying the option related to the classification.

For each option, the name displayed on the setting menu screen may be appropriately set in consideration of ease of understanding by the driver. For example, in the option related to the virtual vehicle, the displayed name may be a more specific one in which the driver, such as a vehicle type or a product name, easily images the virtual vehicle.

As described above, the driver can select the control mode by operating HMI 20. The control device 101 controls battery electric vehicle 100 according to the selected control mode.

The control device 101 according to the present embodiment functions as a motor control device that controls the electric motor 2 in response to at least a driver's driving manipulation with respect to the control of battery electric vehicle 100. Specifically, when the processing circuit 102 executes the electric motor control computer program 104 stored in the storage device 103, the control device 101 functions as a motor control device. The electric motor 2 is a driving source of battery electric vehicle 100. Therefore, the motor control device can be said to be a device that performs drive control of battery electric vehicle 100. Hereinafter, the control of battery electric vehicle 100 by the motor control device will be described.

4 Motor Control Device

Figure 3:
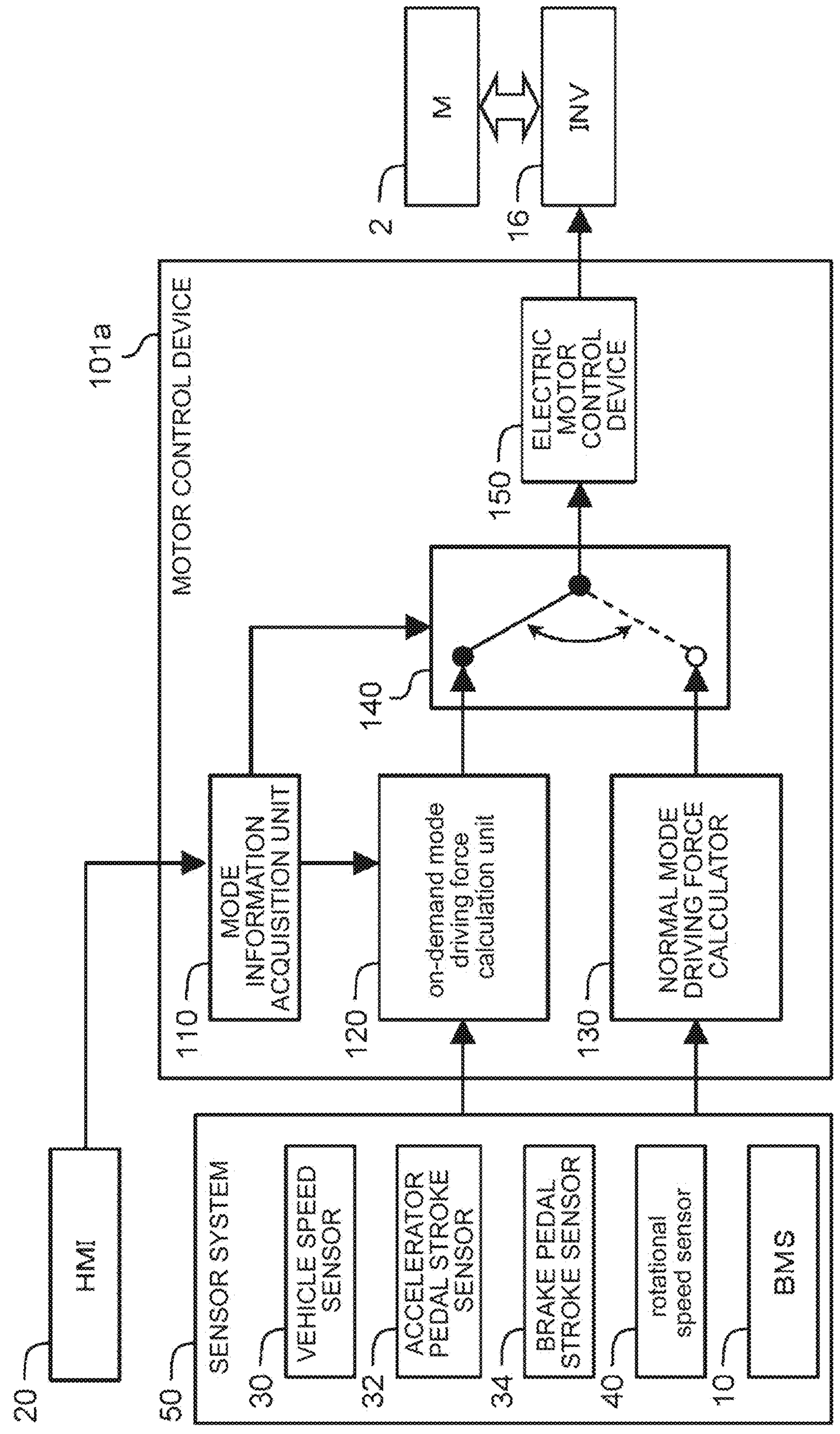
FIG. 3 is a diagram illustrating an example of a functional configuration of a control device functioning as a motor control device.

FIG. 3 is a diagram illustrating an exemplary functional configuration of the motor control device 101*a*. The motor control device 101*a* calculates the target driving force of battery electric vehicle 100 in accordance with the driving manipulation of the driver. The motor control device 101*a* then controls the electric motor 2 via the inverter 16 to provide the calculated target driving force to battery electric vehicle 100.

An HMI 20 and a signal from the sensor system 50 are inputted to the motor control device 101*a*. The sensor system 50 includes a vehicle speed sensor 30, an accelerator pedal stroke sensor 32, a brake pedal stroke sensor 34, a rotational speed sensor 40, and a battery management system 10. The sensor system 50 may include other sensors (not shown). For example, the sensor system 50 may include a steering angle sensor for detecting a steering angle of the steering wheel, a yaw rate sensor for detecting a yaw rate of battery electric vehicle 100, an Inertial Measurement Unit (IMU) for detecting an attitude of battery electric vehicle 100, a sensor for detecting an ambient environment of battery electric vehicle 100, and the like. Sensors for detecting the surroundings of battery electric vehicle 100 are, for example, cameras, radars, and LiDAR.

The signal inputted from HMI 20 to the motor control device 101*a* includes a signal indicating a control mode selected by the driver and a signal indicating a target virtual vehicle selected by the driver. The signal inputted from the sensor system 50 to the motor control device 101*a* includes a signal indicating the vehicle speed of battery electric vehicle 100, a signal indicating the operation state of the accelerator pedal 22, a signal indicating the operation state of the brake pedal 24, a signal indicating the rotational speed of the electric motor 2, and a signal indicating the state of the battery 14. The battery 14 may be, for example, a cell voltage, a current, a temperature, or an SOC.

The motor control device 101*a* includes, as functional blocks, a mode information acquisition unit 110, an on-demand mode driving force calculation unit 120, a normal mode driving force calculation unit 130, a target driving force switching unit 140, and an electric motor control unit 150. These functional blocks are realized by the cooperation of the processing circuit 102 which executes the computer program 104 and the storage device 103.

The mode information acquisition unit 110 receives a signal from HMI 20 and acquires information on which of the normal mode and the on-demand mode is selected. The mode information acquisition unit 110 acquires information of the target virtual vehicle selected by the driver. The mode information acquisition unit 110 transmits information on the selected control mode to the target driving force switching unit 140. The mode information acquisition unit 110 transmits information of the selected target virtual vehicle to the on-demand mode driving force calculation unit 120.

The on-demand mode driving force calculation unit 120 acquires information of the target virtual vehicle selected by the driver from the mode information acquisition unit 110. Then, the on-demand mode driving force calculation unit 120 calculates the target driving force as the on-demand mode based on the signal from the sensor system 50. That is, the on-demand mode driving force calculation unit 120 calculates a target driving force for reproducing the acceleration feeling of the target virtual vehicles with respect to the driving manipulation of the driver by battery electric vehicle 100. Details of the processing executed by the on-demand mode driving force calculation unit 120 will be described later.

The normal mode driving force calculation unit 130 calculates the target driving force as the normal mode based on the signal from the sensor system 50. That is, the normal mode driving force calculation unit 130 calculates a target driving force for operating battery electric vehicle 100 as a normal BEV. For example, the normal mode driving force calculation unit 130 calculates the target driving force using a map in which the accelerator operation amount of the accelerator pedal 22 and the rotation speed of the electric motor 2 are used as parameters. Further, the normal mode driving force calculation unit 130 may be configured to calculate the target driving force using the brake opening degree of the brake pedal 24 and SOC of the battery 14 as parameters. However, in the present embodiment, the processing executed by the normal mode driving force calculation unit 130 is not particularly limited. Other suitable known techniques may be applied to the processing executed by the normal mode driving force calculation unit 130.

The target driving force switching unit 140 switches the target driving force of battery electric vehicle 100 used for controlling the electric motor 2 in accordance with the selected control mode. The target driving force switching unit 140 acquires information on the control mode selected from the mode information acquisition unit 110. When the on-demand mode is selected, the target driving force switching unit 140 transmits the target driving force calculated by the on-demand mode driving force calculation unit 120 to the electric motor control unit 150 as battery electric vehicle 100 target driving force. On the other hand, when the normal mode is selected, the target driving force switching unit 140 transmits the target driving force calculated by the normal mode driving force calculation unit 130 to the electric motor control unit 150 as battery electric vehicle 100 target driving force.

When the on-demand mode is selected, the normal mode driving force calculation unit 130 may be configured not to execute processing. Similarly, when the normal mode is selected, the on-demand mode driving force calculation unit 120 may be configured not to execute the processing.

Battery electric vehicle 100 target driving force is inputted to the electric motor control unit 150 via the target driving force switching unit 140. That is, when the on-demand mode is selected, the target driving force calculated by the on-demand mode driving force calculation unit 120 is input to the electric motor control unit 150. On the other hand, when the normal mode is selected, the target driving force calculated by the normal mode driving force calculation unit 130 is input to the electric motor control unit 150. The electric motor control unit 150 changes the motor torque outputted by the electric motor 2 so as to apply the inputted target driving force to battery electric vehicle 100. More specifically, the electric motor control unit 150 generates a control signal for the inverter 16 in accordance with the input target driving force. Then, the electric motor control unit 150 changes the motor torque outputted from the electric motor 2 via PWM control by the inverter 16.

In this manner, the motor control device **101*a* controls the electric motor 2 to provide battery electric vehicle 100 with the target driving force. Therefore, according to the motor control device 101*a*, the acceleration characteristic of battery electric vehicle 100 when the on-demand mode is selected is an acceleration characteristic simulating the acceleration characteristic of the target virtual vehicle selected by the driver. On the other hand, the acceleration characteristic of battery electric vehicle 100** when the normal mode is selected is the acceleration characteristic of the normal BEV.

Figure 4:
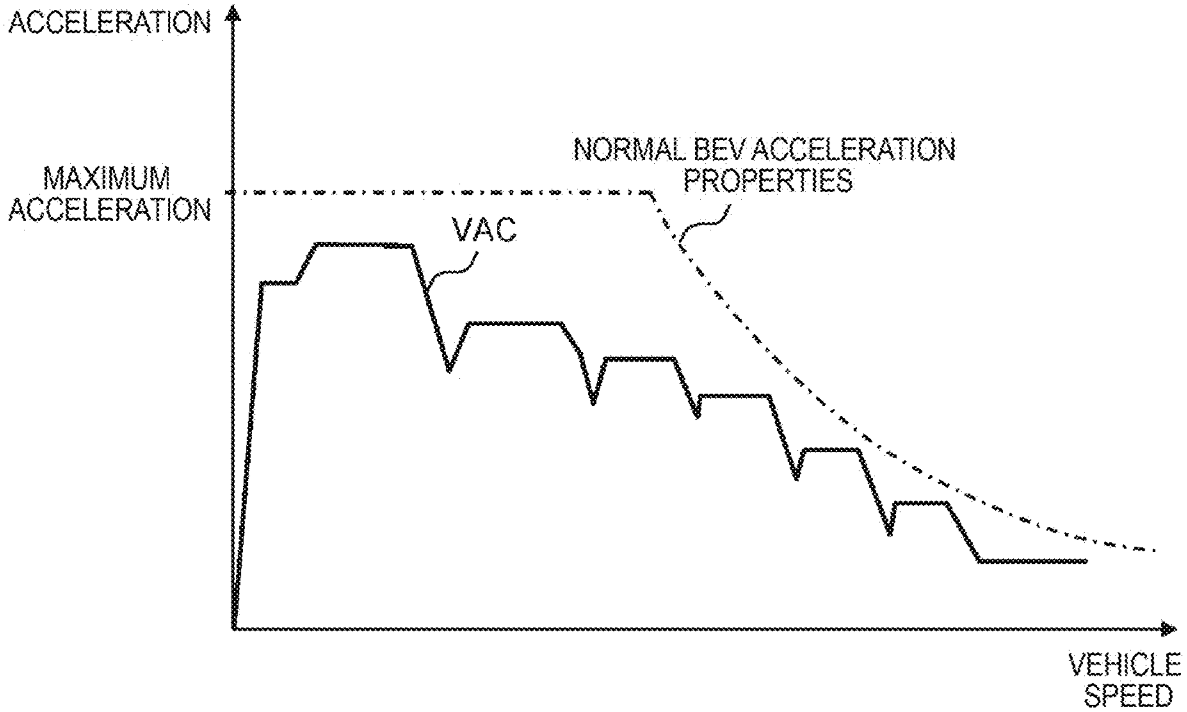
FIG. 4 is a diagram illustrating an exemplary acceleration property of a battery electric vehicle realized when the control mode is the on-demand mode.

FIG. 4 is a diagram illustrating an exemplary acceleration property VAC of battery electric vehicle 100 when the on-demand mode is selected. In addition, FIG. 4 shows an acceleration characteristic (dashed-dotted line) of a normal BEV as a comparative example. When the on-demand mode is selected, the acceleration characteristic VAC of battery electric vehicle 100 changes to various patterns corresponding to the target virtual vehicle by changing the target virtual vehicle. This is because the target driving force calculated in the on-demand mode varies depending on the target virtual vehicle selected by the driver. Consequently, in the on-demand mode, the driver can enjoy the acceleration feeling of the various virtual vehicles in battery electric vehicle 100.

Hereinafter, calculation of the target driving force in the on-demand mode, that is, processing executed by the on-demand mode driving force calculation unit 120 will be described in detail.

4.1 Calculation of Target Driving Force in On-Demand Mode

The on-demand mode driving force calculation unit 120 calculates the target driving force so as to reproduce the acceleration feeling of the target virtual vehicles with respect to the driving manipulation of the driver by battery electric vehicle 100. In particular, the on-demand mode driving force calculation unit 120 employs a method of calculating (simulating) a virtual acceleration when the target virtual vehicle is driven using the vehicle model of the target virtual vehicle, and calculating a target driving force so that the acceleration of battery electric vehicle 100 becomes a virtual acceleration. The vehicle model of the target virtual vehicle is hereinafter referred to as a "target vehicle model". The method of calculating the target driving force so that the acceleration of battery electric vehicle 100 becomes the virtual acceleration is hereinafter referred to as a "virtual acceleration-based method".

Incidentally, the acceleration that can be realized by battery electric vehicle 100 is naturally limited in relation to the output-characteristics of the motor torque of the electric motor 2. The acceleration that battery electric vehicle 100 can achieve is the acceleration capability of battery electric vehicle 100. In particular, the acceleration capability of battery electric vehicle 100 is comparable to the acceleration properties of conventional BEV. That is, the acceleration characteristics that can be realized in battery electric vehicle 100 are within the acceleration characteristics of the normal BEV.

Figure 5:
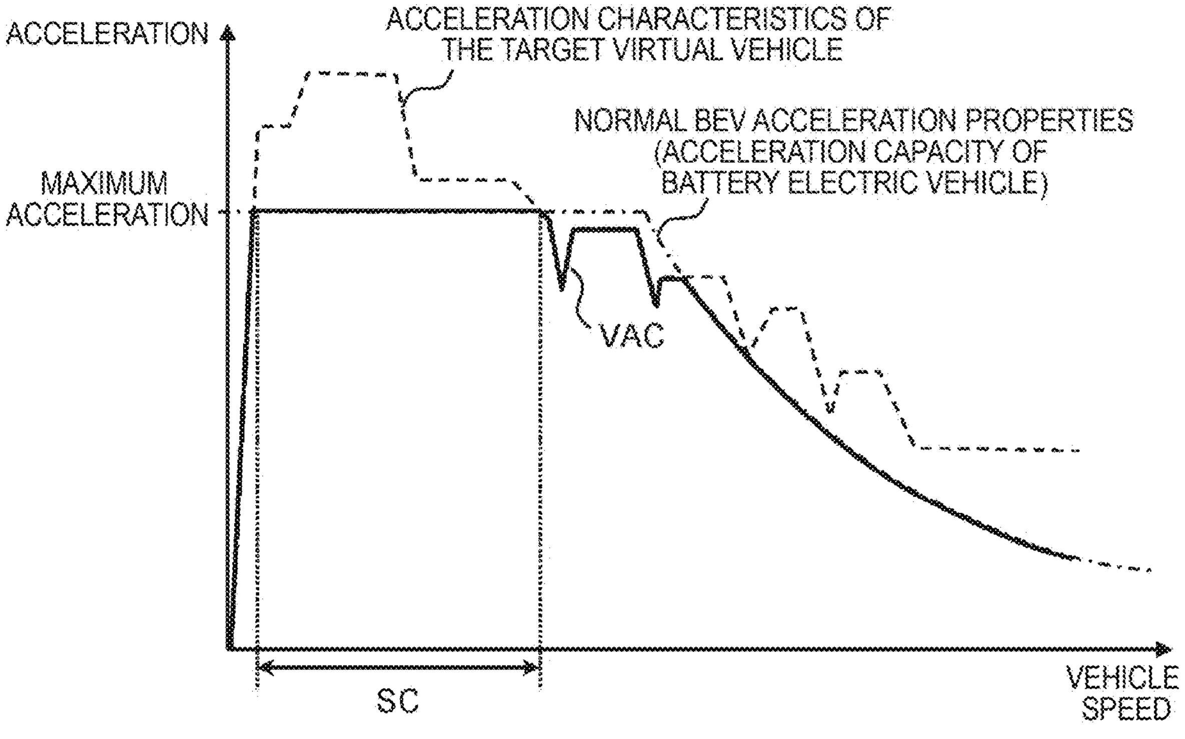
FIG. 5 is a diagram illustrating an exemplary acceleration characteristic of a battery electric vehicle that is normally realized when an acceleration characteristic of a target virtual vehicle exceeds an acceleration capacity of a battery electric vehicle.

Therefore, in the virtual acceleration-based method, when the acceleration characteristic of the target virtual vehicle exceeds the acceleration capability of battery electric vehicle 100, the acceleration characteristic of the target virtual vehicle cannot be realized as it is in battery electric vehicle 100. FIG. 5 is a diagram illustrating an exemplary acceleration characteristic VAC of a battery electric vehicle 100 that is normally realized when an acceleration characteristic of a target virtual vehicle exceeds an acceleration capacity of a battery electric vehicle 100. In the embodiment illustrated in FIG. 5, the acceleration capability of battery electric vehicle 100 is represented by a dashed-dotted line, and the acceleration performance of the elephant virtual vehicles is represented by a dashed line. Due to the limitation of the acceleration capability of battery electric vehicle 100, the acceleration characteristic VAC of battery electric vehicle 100 cannot realize the acceleration characteristics of the target virtual vehicles as they are. In such a battery electric vehicle 100 acceleration characteristic VAC, there is a possibility that the acceleration feeling of the target virtual vehicle cannot be reproduced when the driver attempts to accelerate battery electric vehicle 100 by depressing the accelerator pedal 22.

In the embodiment shown in FIG. 5, one of the elements not fully realized in the acceleration property VAC is the form of the acceleration variation in the section exceeding the acceleration capability of battery electric vehicle 100. For example, the acceleration in the acceleration characteristic VAC is constant at the maximal acceleration that can be realized in battery electric vehicle 100 while the acceleration in the acceleration characteristic of the target virtual vehicle greatly fluctuates during the section SC. A second element that is not fully realized in the acceleration property VAC is the magnitude of acceleration in a section exceeding the acceleration capability of battery electric vehicle 100. For example, during the section SC, there is a difference between the acceleration in the acceleration characteristic of the target virtual vehicle and the acceleration in the acceleration characteristic VAC.

Among these two elements, the difference in the shape of the acceleration variation greatly affects the sense of acceleration given to the driver. On the other hand, if the difference in the shape of the acceleration fluctuation is small, even if there is a difference in the magnitude of the acceleration, the influence on the acceleration feeling given to the driver is small.

Therefore, based on the above aspect, the on-demand mode driving force calculation unit 120 according to the present embodiment is configured to realize the acceleration characteristic VAC of battery electric vehicle 100 that can reproduce the acceleration feeling of the target virtual vehicle even when the acceleration characteristic of the target virtual vehicle exceeds the acceleration capability of battery electric vehicle 100. That is, the on-demand mode driving force calculation unit 120 is configured to realize acceleration characteristic VAC of a battery electric vehicle 100 having a shape of acceleration variation of acceleration characteristics of the target virtual vehicles within the range of the acceleration capability of battery electric vehicle 100.

Figure 6:
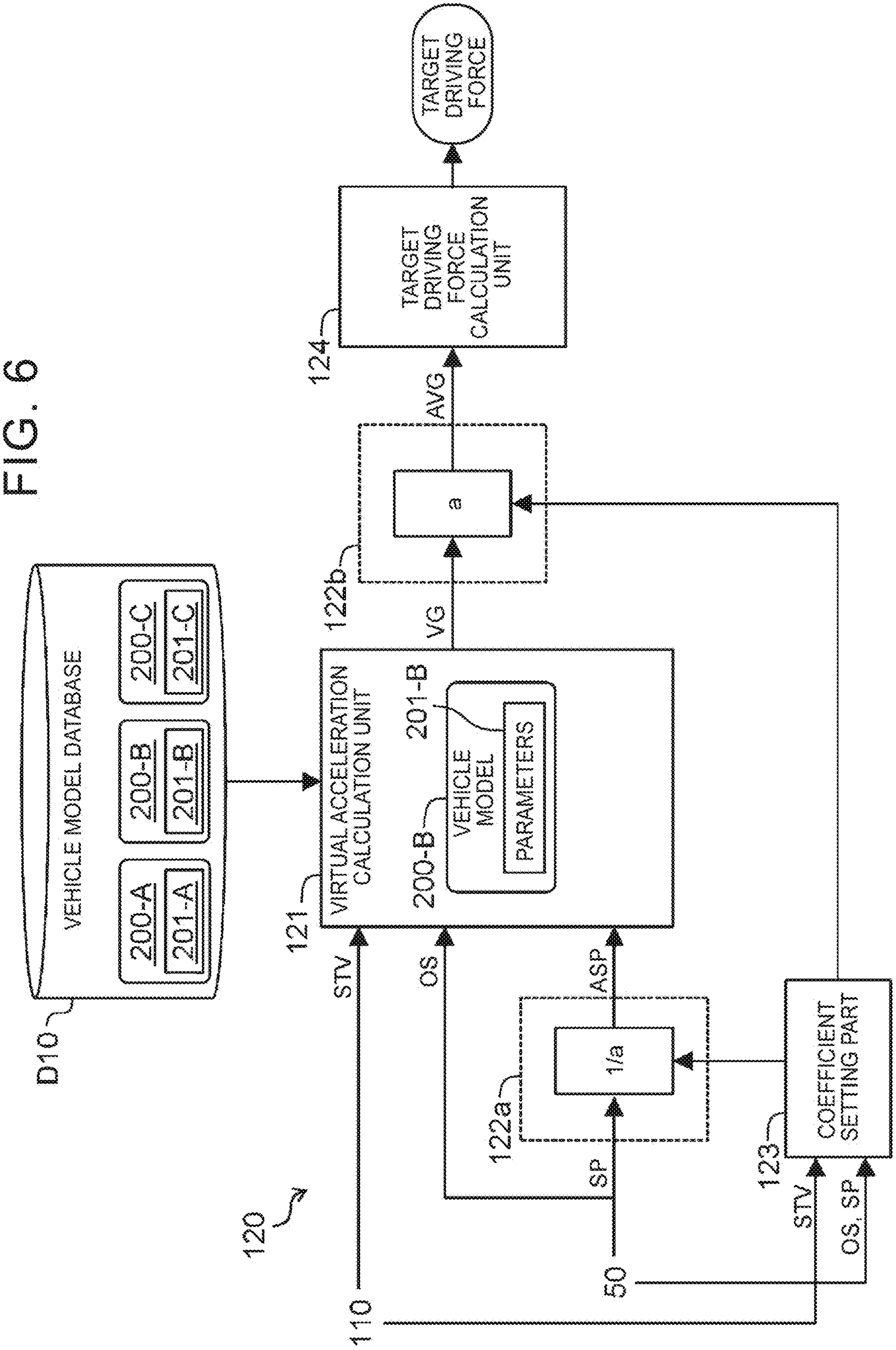
FIG. 6 is a diagram illustrating an example of a functional configuration of the on-demand mode driving force calculation unit illustrated in FIG. 3.

FIG. 6 is a diagram illustrating an example of a functional configuration of the on-demand mode driving force calculation unit 120. The on-demand mode driving force calculation unit 120 includes, as functional blocks, a virtual acceleration calculation unit 121, a vehicle speed adjustment unit 122*a*, a virtual acceleration adjustment unit 122*b*, a coefficient setting unit 123, and a target driving force calculation unit 124. The on-demand mode driving force calculation unit 120 is configured to be accessible to the vehicle model database D10.

The vehicle model database D10 is a database for managing a plurality of vehicle models 200 modeled on a plurality of virtual vehicles. The vehicle model database D10 may be implemented as data 105 stored in the storage device 103. In addition, a new vehicle model 200 may be downloaded to the vehicle model database D10 at any time. In the exemplary embodiment shown in FIG. 6, the vehicle model database D10 manages three vehicle models 200-A, 200-B, and 200-C. The vehicle models 200 are models that simulate the operation of the virtual vehicle with respect to the driving operation of the driver by inputting at least the operation status of the driving operation member and battery electric vehicle 100 vehicle speed. Each vehicle model 200 is configured to be able to simulate at least a driving operation, in particular, an operation of the accelerator pedal 22, a driving force applied to the virtual vehicle and an acceleration/deceleration operation of the virtual vehicle caused by the driving force acting on the virtual vehicle. The simulation result of the acceleration/deceleration operation of the virtual vehicle in each vehicle model 200 includes the virtual acceleration of the virtual vehicle. That is, each vehicle model 200 is configured to be able to calculate the virtual acceleration of the virtual vehicle with respect to the driving operation of the driver.

Typically, each vehicle model 200 includes a control model that simulates a control system related to a powertrain of a virtual vehicle, and a plant model that simulates an acceleration/deceleration operation of the virtual vehicle in response to a control signal from the control model. In this case, the plant model includes a model of the powertrain that operates based on the control signal from the control model, and a model for simulating the operation of the virtual vehicle by the action of the virtual driving force output from the powertrain model. An example of the configuration of the vehicle model 200 will be described later.

Each vehicle model 200 also has parameters 201 associated with the operation of the virtual vehicle in the simulation. Examples of the parameter 201 include a vehicle weight, a tire diameter, each gear ratio, an engine maximum torque, an engine torque response, a transmission timing, and the like. The contents of the parameter 201 may be different for each vehicle model 200. The vehicle model 200 expresses a model of one virtual vehicle by a combination with a set value of the parameter 201. For example, each virtual vehicle corresponds to a combination of a vehicle model 200 and a set value of a parameter 201, as shown in the following table. As shown in the following table, the same vehicle model 200 may correspond to different virtual vehicles. This is the case where the types of the powertrain systems are the same as each other, and the respective virtual vehicles can be represented by changing the setting values of the parameters 201.

TABLE 1

| Virtual vehicle | Vehicle model | Parameters |
|---|---|---|
| Virtual vehicle A1 | 200-A | Setting A1 |
| Virtual vehicle A2 | 200-A | Setting A2 |
| Virtual vehicle B1 | 200-B | Setting B1 |
| Virtual vehicle C1 | 200-C | Setting C1 |
| Virtual vehicle C2 | 200-C | Setting C2 |

The virtual acceleration calculation unit 121 acquires information of the target virtual vehicle STV selected by the driver from the mode information acquisition unit 110. Then, the virtual acceleration calculation unit 121 refers to the vehicle model database D10 and reads out the vehicle model 200 (target vehicle model) corresponding to the target virtual vehicle STV. In the embodiment shown in FIG. 6, the virtual acceleration calculation unit 121 reads the vehicle-model 200-B. Further, the virtual acceleration calculation unit 121 sets the parameter 201 of the read vehicle model 200 in accordance with the target virtual vehicle STV. For example, when the target virtual vehicle STV is the "virtual vehicle B1" in the above-described tables, the virtual acceleration calculation unit 121 sets the parameter 201-B of the vehicle model 200-B to the setting B1.

The virtual acceleration calculation unit 121 calculates the virtual acceleration VG of the target virtual vehicle with respect to the operation of the driving operation member of battery electric vehicle 100 using the read target vehicle model. More specifically, the virtual acceleration calculation unit 121 acquires information that is an input of the target vehicle model. At least, the virtual acceleration calculation unit 121 acquires, as inputs of the target vehicle model, information on the operation status OS of the driving operation member (e.g., the accelerator operation amount of the accelerator pedal 22) and information on the adjusted vehicle speed ASP. The operation status OS of the driving operation member is acquired from the sensor system 50. The information of the adjusted vehicle speed ASP is acquired from a vehicle speed adjustment unit 122*a* which will be described later. The adjusted vehicle speed ASP is battery electric vehicle 100 vehicle speed SP adjusted by the vehicle speed adjustment unit 122*a*, as will be described later. The virtual acceleration calculation unit 121 may acquire information to be inputted to the target vehicle model, such as the yaw rate of battery electric vehicle 100 and information of the surrounding environment, according to the configuration of the target vehicle model. The virtual acceleration calculation unit 121 inputs the acquired information to the target vehicle model. Then, the virtual acceleration calculation unit 121 calculates the virtual acceleration VG of the target virtual vehicle STV by simulating the acceleration/deceleration operation of the target virtual vehicle STV using the target vehicle model. The virtual acceleration VG calculated by the virtual acceleration calculation unit 121 is transmitted to the virtual acceleration adjustment unit 122*b*.

The vehicle speed adjustment unit 122*a* executes a process of calculating the adjusted vehicle speed ASP from the vehicle speed SP of battery electric vehicle 100 (vehicle speed adjustment process). Battery electric vehicle 100 vehicle speed SP is acquired from the sensor system 50. In the vehicle speed adjusting process, the vehicle speed adjustment unit 122*a* acquires the coefficient a set by the coefficient setting unit 123 described later. Then, the vehicle speed adjustment unit 122*a* multiplies the vehicle speed SP by the inverse of the coefficient a to calculate the adjusted vehicle speed ASP. That is, ASP=SP/a.

The virtual acceleration adjustment unit 122*b* executes a process (virtual acceleration adjustment process) of calculating the adjusted virtual acceleration AVG from the virtual acceleration VG of the target virtual vehicle. The virtual acceleration VG of the target virtual vehicle is acquired from the virtual acceleration calculation unit 121. In the virtual acceleration adjustment process, the virtual acceleration adjustment unit 122*b* acquires the coefficient a set by the coefficient setting unit 123, which will be described later. Then, the virtual acceleration adjustment unit 122*b* multiplies the virtual acceleration VG by the factor "a" to calculate the adjusted virtual acceleration AVG. That is, AVG=VG·a. The adjusted virtual acceleration AVG calculated by the virtual acceleration adjustment unit 122*b* is transmitted to the target driving force calculation unit 124.

The coefficient setting unit 123 sets the coefficient a used in the vehicle speed adjustment unit 122*a* and the virtual acceleration adjustment unit 122*b* in accordance with the acceleration property of the target virtual vehicle STV.

The setting of the coefficient a by the coefficient setting unit 123 is performed based on whether the acceleration characteristic of the target virtual vehicle STV exceeds the acceleration capability of battery electric vehicle 100. Therefore, the coefficient setting unit 123 manages the acceleration characteristics of each of the plurality of virtual vehicles that can be selected in the on-demand mode. The coefficient setting unit 123 acquires information of the target virtual vehicle STV from the mode information acquisition unit 110, and refers to the acceleration property of the target virtual vehicle STV. The coefficient setting unit 123 manages acceleration characteristics (battery electric vehicle 100 acceleration capability) as a normal BEV of battery electric vehicle 100.

When the acceleration characteristic of the target virtual vehicle STV does not exceed the acceleration capacity of battery electric vehicle 100, the coefficient setting unit 123 sets the coefficient a to 1. That is, at this time, in the virtual acceleration adjustment unit 122*b*, the virtual acceleration VG becomes the adjusted virtual acceleration AVG as it is.

On the other hand, when the acceleration characteristic of the target virtual vehicle STV exceeds the acceleration capability of battery electric vehicle 100, the coefficient a is set to a value less than 1 in which the adjusted virtual acceleration AVG is within the acceleration capability of battery electric vehicle 100. As a specific example, the coefficient setting unit 123 may be configured to set the coefficient a to a value obtained by dividing the maximum achievable acceleration of battery electric vehicle 100 by the maximum acceleration in the acceleration characteristic of the target virtual vehicle. The maximum possible acceleration of battery electric vehicle 100 is hereinafter referred to as the "maximum possible acceleration". The maximum acceleration in the acceleration characteristic of the target virtual vehicle is hereinafter referred to as "virtual maximum acceleration". That is, the coefficient setting unit 123 sets the coefficient a to the maximum possible acceleration/the virtual maximum acceleration. In this case, since the adjusted virtual acceleration AVG becomes the maximum possible acceleration when the virtual acceleration VG becomes the virtual maximum acceleration, the adjusted virtual acceleration AVG can be set within the acceleration capability of battery electric vehicle 100. The coefficient setting unit 123 may be configured to set the coefficient a to a value smaller than a possible maximum acceleration/virtual maximum acceleration.

By setting the coefficient a by the coefficient setting unit 123 as described above, the adjusted virtual acceleration AVG calculated by the virtual acceleration adjustment unit 122*b* for any driving operation is within the acceleration capability of battery electric vehicle 100. Even when the acceleration characteristic of the target virtual vehicle STV exceeds the acceleration capability of battery electric vehicle 100, the virtual acceleration VG does not exceed the acceleration capability of battery electric vehicle 100 while battery electric vehicle 100 is decelerating. That is, while battery electric vehicle 100 is decelerating, regardless of the acceleration property of the target virtual vehicle STV, the virtual acceleration VG can be realized as it is in battery electric vehicle 100.

Therefore, the coefficient setting unit 123 may be further configured to set the coefficient to 1 regardless of the acceleration property of the target virtual vehicle STV while battery electric vehicle 100 is decelerating. That is, at this time, in the virtual acceleration adjustment unit 122*b*, the virtual acceleration VG becomes the adjusted virtual acceleration AVG as it is. The coefficient setting unit 123 can be configured to determine whether battery electric vehicle 100 is decelerating, based on the information on the operation status OS of the driving operation member acquired from the sensor system 50 and the information on battery electric vehicle 100 vehicle speed SP. For example, the coefficient setting unit 123 determines that battery electric vehicle 100 is decelerating in response to the fact that the accelerator operation amount has decreased. Further, for example, the coefficient setting unit 123 determines that battery electric vehicle 100 is decelerating directly from the change in the vehicle speed.

The target driving force calculation unit 124 acquires the adjusted virtual acceleration AVG from the virtual acceleration adjustment unit 122*b*, and calculates a target driving force for setting the acceleration of battery electric vehicle 100 as the adjusted virtual acceleration AVG. For example, the target driving force calculation unit 124 converts the adjusted virtual acceleration AVG into the target driving force $F_{veh}$ using a simple inverse model of battery electric vehicle 100, as shown in the following equation. In the following equation, m is the weight of battery electric vehicle 100, $F_{load}$, is the actual running drag on battery electric vehicle 100. The on-demand mode driving force calculation unit 120 outputs the target driving force calculated by the target driving force calculation unit 124.

$$F_{veh} = m * AVG - F_{load} \quad \text{(Mathematical formula 1)}$$

Figure 7:
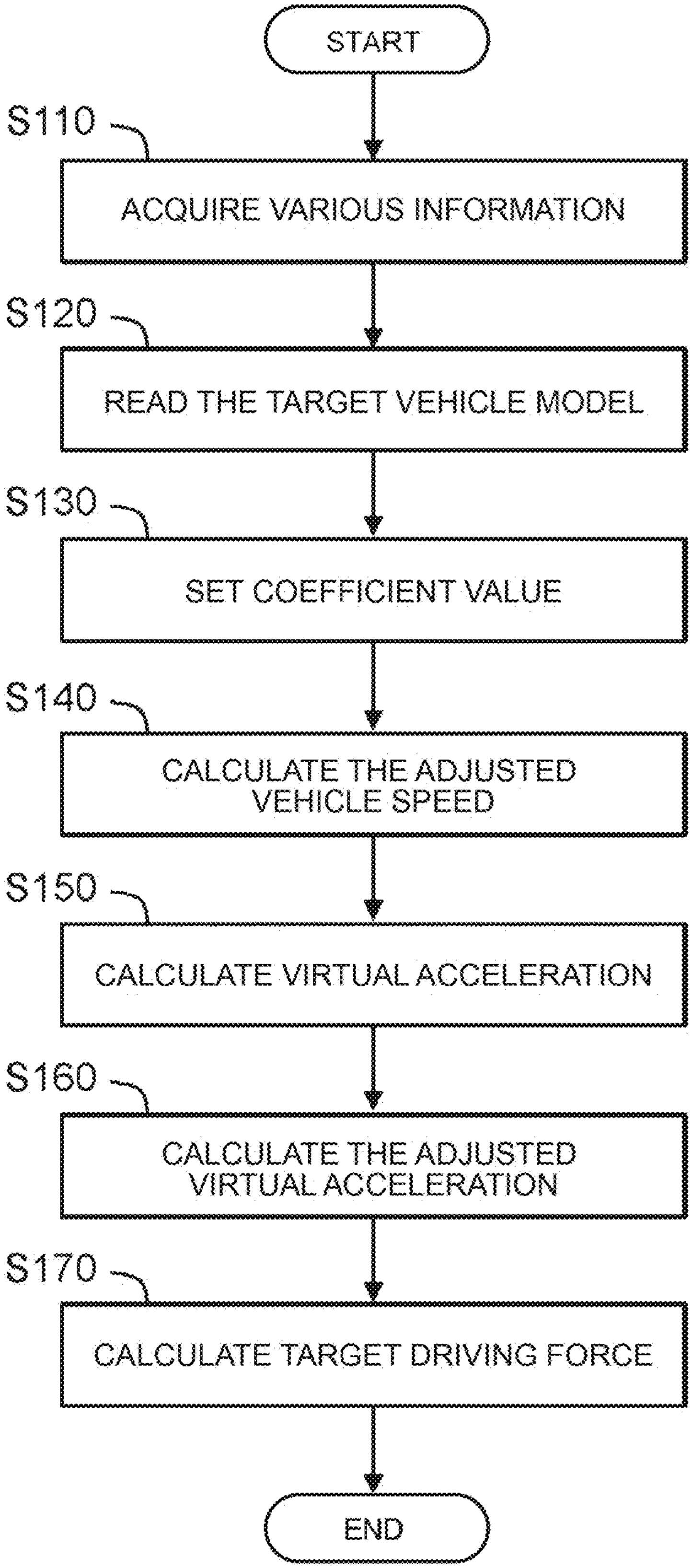
FIG. 7 is a flowchart illustrating a processing flow of processing executed by the on-demand mode driving force calculation unit.

As described above, the functional configuration of the on-demand mode driving force calculation unit 120 according to the present embodiment can be provided. FIG. 7 is a flowchart illustrating a processing flow of processing executed by the on-demand mode driving force calculation unit 120 based on the above-described functional configuration. The processing flow illustrated in FIG. 7 is repeatedly executed at a predetermined processing cycle.

In S110, the on-demand mode driving force calculation unit 120 acquires various types of data. For example, the on-demand mode driving force calculation unit 120 acquires information of the target virtual vehicle STV from the mode information acquisition unit 110. The on-demand mode driving force calculation unit 120 also acquires information on the operation status OS of the driving operation member and information on battery electric vehicle 100 vehicle speed SP from the sensor system 50.

Next, in S120, the on-demand mode driving force calculation unit 120 refers to the vehicle model database D10 and reads out the vehicle model 200 (target vehicle model) corresponding to the target virtual vehicle STV.

Figure 8:
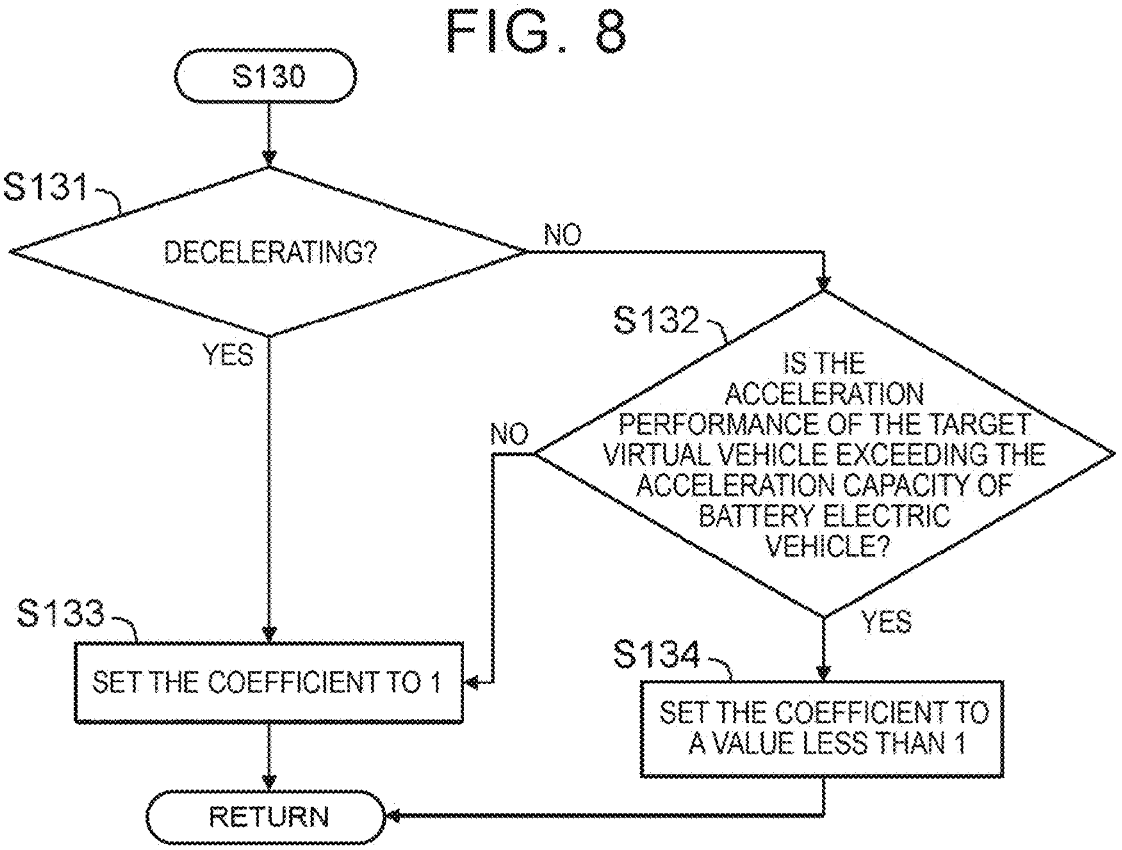
FIG. 8 is a flowchart illustrating an example of processing related to setting of coefficients.

Next, in S130, the on-demand mode driving force calculation unit 120 sets the coefficient a according to the acceleration characteristic of the target virtual vehicle. FIG. 8 is a flow chart illustrating an exemplary process according to S130.

In S131, the on-demand mode driving force calculation unit 120 determines whether battery electric vehicle 100 is decelerating. While battery electric vehicle 100 is decelerating (S131; Yes), the on-demand mode driving force calculation unit 120 sets the factor a to 1 (S133), and ends the process related to S130. When battery electric vehicle 100 is not decelerating (S131; No), the process proceeds to S132.

In S132, the on-demand mode driving force calculation unit 120 determines whether the acceleration characteristic of the target virtual vehicle STV exceeds battery electric vehicle 100 acceleration capability. When the acceleration characteristic of the target virtual vehicle STV exceeds the acceleration capability of battery electric vehicle 100 (S132; Yes), the on-demand mode driving force calculation unit 120 sets the coefficient a to a value less than 1 in which the adjusted virtual acceleration AVG is within the acceleration capability of battery electric vehicle 100 (S134). The on-demand mode driving force calculation unit 120 ends the process related to S130. When the acceleration characteristic of the target virtual vehicle STV does not exceed the acceleration capacity of battery electric vehicle 100, the on-demand mode driving force calculation unit 120 sets the coefficient a to 1 (S133), and ends the process related to S130.

Refer once again to FIG. 7 After S130, next in S140, the on-demand mode driving force calculation unit 120 calculates the adjusted vehicle speed ASP by multiplying the vehicle speed SP by the inverse of the coefficient a.

Next, in S150, the on-demand mode driving force calculation unit 120 calculates the virtual acceleration VG of the target virtual vehicle STV with respect to the operation of the driving operation member using the target vehicle model.

Next, in S160, the on-demand mode driving force calculation unit 120 calculates the adjusted virtual acceleration AVG by multiplying the virtual acceleration VG by the factor a.

Next, in S170, the on-demand mode driving force calculation unit 120 calculates a target driving force for setting the acceleration of battery electric vehicle 100 as the adjusted virtual acceleration AVG. Thereafter, the present processing is ended.

Figure 9:
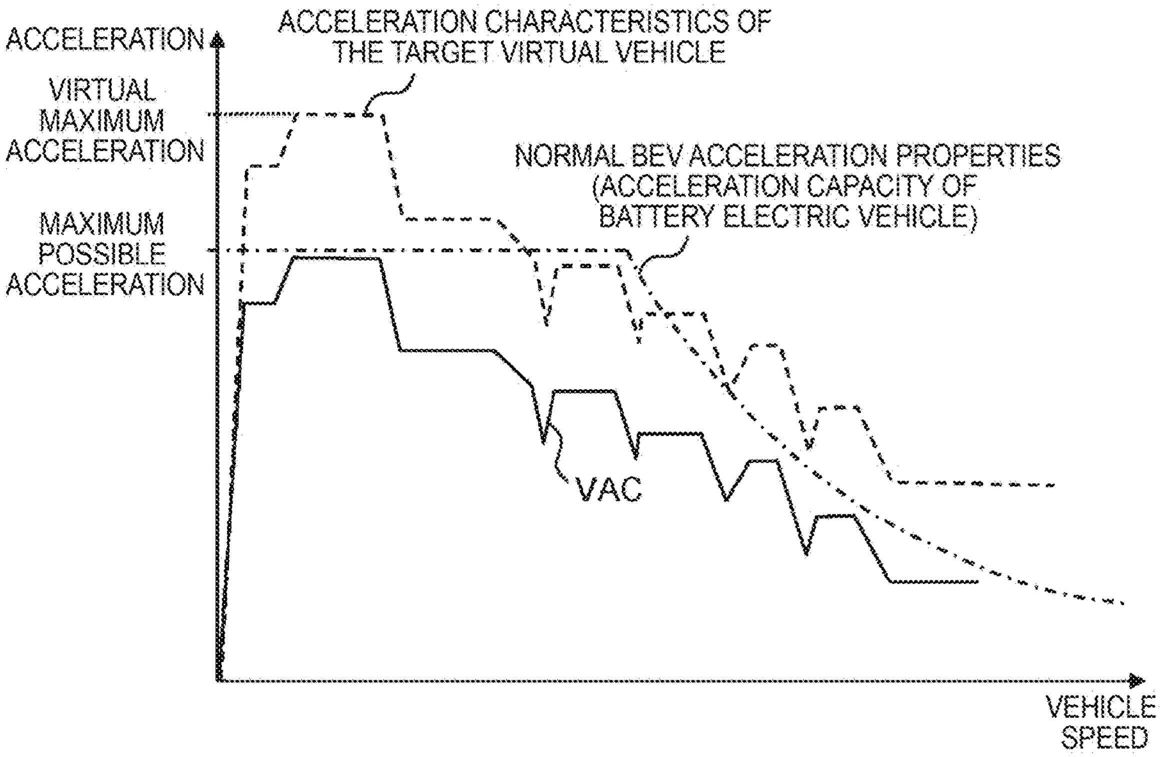
FIG. 9 is a diagram illustrating an exemplary acceleration property of a battery electric vehicle realized by the motor control device according to the embodiment.

As described above, according to the present embodiment, the on-demand mode driving force calculation unit 120 calculates the adjusted virtual acceleration AVG by multiplying the virtual acceleration VG by a factor a equal to or less than 1 according to the acceleration property of the target virtual vehicle STV. The adjusted virtual acceleration AVG is calculated to be within the acceleration capability of battery electric vehicle 100. Further, since the adjusted virtual acceleration AVG is calculated by multiplying the coefficient a, it has the same variation as the virtual acceleration VG. Then, the on-demand mode driving force calculation unit 120 calculates a target driving force in which the acceleration of battery electric vehicle 100 becomes the adjusted virtual acceleration AVG. The acceleration performance of the target virtual vehicle STV may exceed the acceleration capability of battery electric vehicle 100. Also in this case, according to the present embodiment, it is possible to realize battery electric vehicle 100 acceleration characteristic VAC having the shape of the acceleration variation of the acceleration characteristic of the target virtual vehicle STV within the range of the acceleration capability of battery electric vehicle 100. That is, it is possible to realize battery electric vehicle 100 acceleration property VAC that can reproduce the acceleration feeling of the target virtual vehicles. FIG. 9 shows an exemplary acceleration property VAC of battery electric vehicle 100 realized by the present embodiment. In this way, according to the present embodiment, the acceleration feeling of the virtual vehicles exceeding the acceleration capability of battery electric vehicle 100 can be reproduced by battery electric vehicle 100. As a consequence, the driver can enjoy the acceleration feeling of the virtual vehicles exceeding the acceleration capability of battery electric vehicle 100. In addition, it is possible to increase the number of variations of the virtual vehicle that can reproduce the acceleration feeling in the on-demand mode, and thus it is possible to improve the satisfaction level of the user.

Further, according to the present embodiment, in the calculation of the virtual acceleration VG, the on-demand mode driving force calculation unit 120 inputs the adjusted vehicle speed ASP to the target vehicle model instead of battery electric vehicle 100 vehicle speed SP. As a result, the accuracy of the simulation of the operation of the target virtual vehicle STV using the target vehicle model can be improved as described below. As a consequence, it is possible to realize the acceleration property VAC of battery electric vehicle 100 that more faithfully reproduces the acceleration feeling of the target virtual vehicle STV, and it is possible to improve the satisfaction of the driver.

Figure 10:
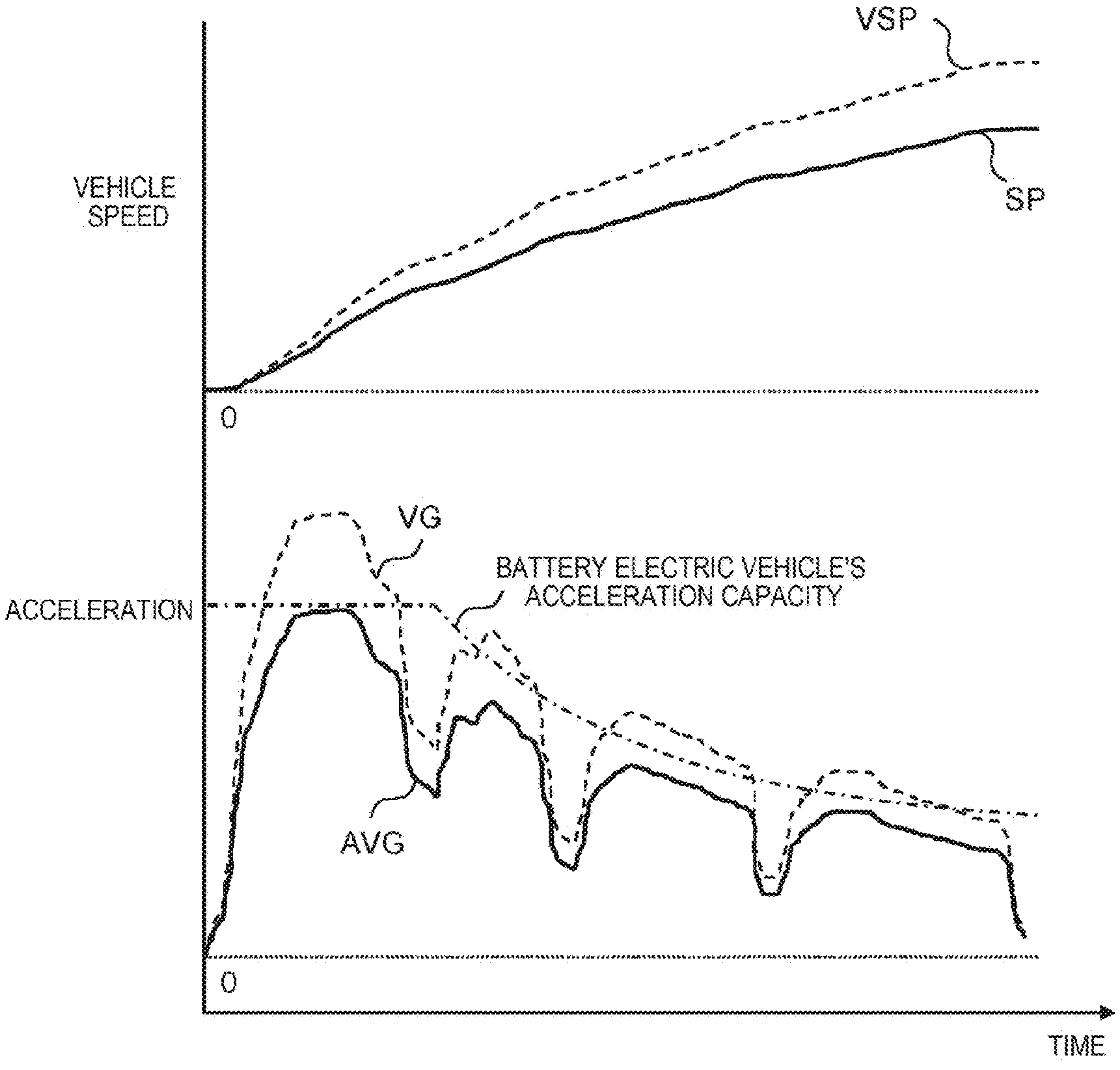
FIG. 10 is a diagram illustrating an exemplary comparison between the vehicle speed and the virtual vehicle speed when battery electric vehicle starts and accelerates, and a comparison between the adjusted virtual acceleration and the virtual acceleration.

As described above, according to the present embodiment, the acceleration of battery electric vehicle 100 in the on-demand mode is controlled to be the adjusted virtual acceleration AVG. The adjusted virtual acceleration AVG is calculated by multiplying the virtual acceleration VG by a factor a. In particular, when the factor a is set to be less than 1, the adjusted virtual acceleration AVG is smaller than the virtual acceleration VG. For this reason, the vehicle speed SP realized by battery electric vehicle 100 differs according to the vehicle speed and the coefficient a in simulating the acceleration/deceleration operation of the target virtual vehicle STV in which the virtual acceleration VG is calculated. The vehicle speed in the simulation of the acceleration/deceleration operation of the target virtual vehicle STV in which the virtual acceleration VG is calculated is hereinafter referred to as "virtual vehicle speed". More specifically, if the virtual vehicle speed is a VSP, since it is AVG=VG·a, it is SP=VSP·a. That is, when the coefficient a is set to be less than 1, the vehicle speed SP is also smaller than the virtual vehicle speed VSP. FIG. 10 is a diagram illustrating an exemplary comparison between the vehicle speed SP and the virtual vehicle speed VSP and a comparison between the adjusted virtual acceleration AVG and the virtual acceleration VG when battery electric vehicle 100 starts and accelerates when the coefficient a is set to a value less than 1. As shown in FIG. 10, since the adjusted virtual acceleration AVG is smaller than the virtual acceleration VG, the vehicle speed SP realized by battery electric vehicle 100 is also smaller than the virtual vehicle speed VSP.

It is conceivable that battery electric vehicle 100 vehicle speed SP is directly inputted into the target vehicle model and the operation of the target virtual vehicle STV is simulated. In this situation, the simulated accuracy may be reduced due to differences between the vehicle speed SP and the virtual vehicle speed VSP. For example, a vehicle model of an automatic transmission vehicle (AT vehicle) with a stepped transmission is typically configured to determine a gear stage based on an accelerator operation amount and a vehicle speed. When the target virtual vehicle STV is a AT vehicle, it is conceivable that a vehicle speed SP smaller than the virtual vehicle speed VSP is directly inputted to the target vehicle model. In this case, a situation occurs in which the shift timing of the stepped transmission in the simulation becomes slower than the original shift timing. This provides the driver with a feeling of acceleration extending therebetween.

According to the present embodiment, the adjusted vehicle speed ASP inputted to the target vehicle model is calculated by multiplying the vehicle speed SP by the inverse of the coefficient a. As a result, since ASP=SP/a=(VSP·a)/a=VSP, the adjusted vehicle speed ASP inputted to the target vehicle model can be made to coincide with the virtual vehicle speed VSP. In this way, according to the present embodiment, it is possible to improve the accuracy of the simulation of the operation of the target virtual vehicle STV using the target vehicle model.

4.1.2 Example of Vehicle Model Configuration

Figure 11:
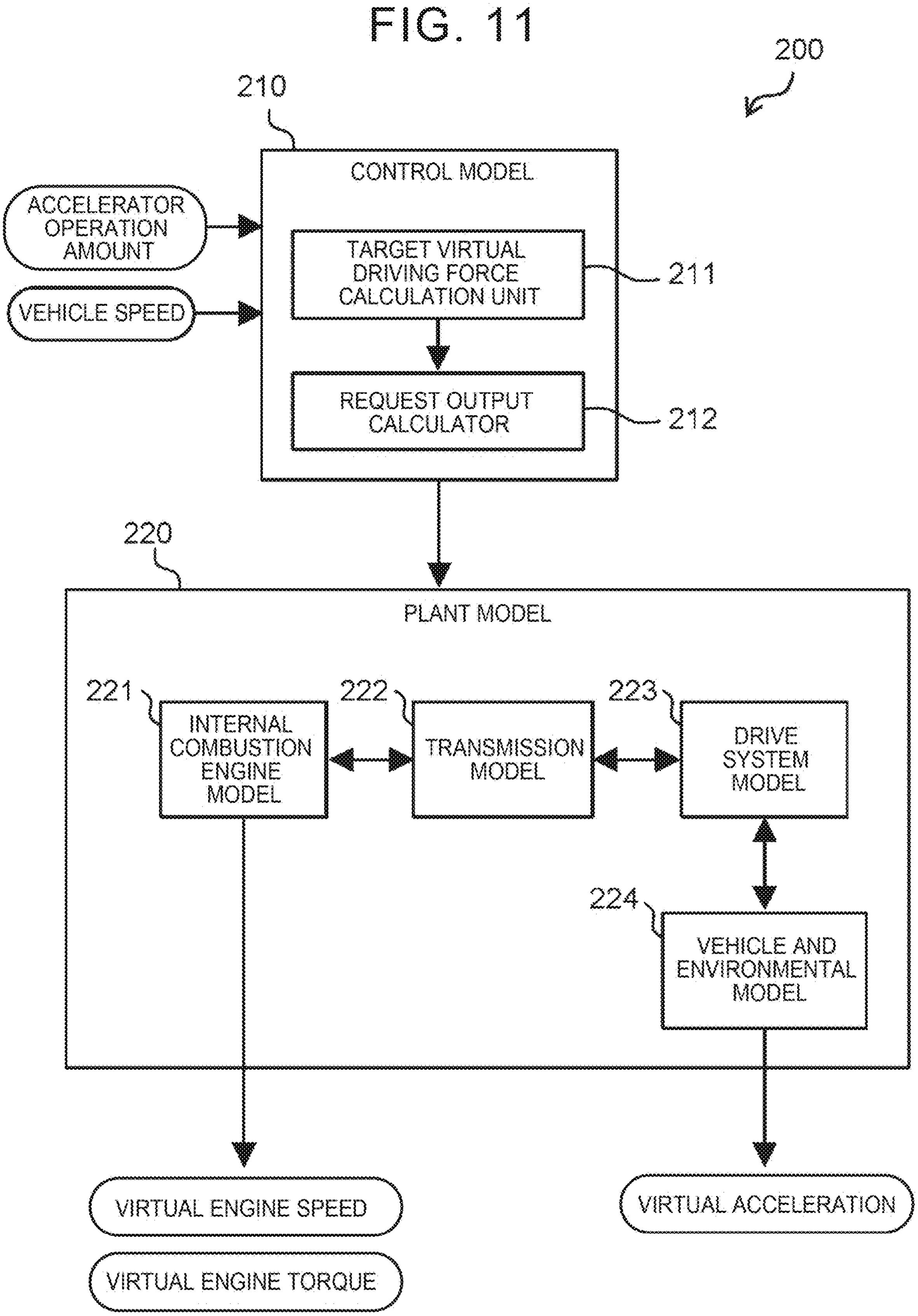
FIG. 11 is a diagram illustrating an exemplary configuration of a vehicle model.

Here, an exemplary configuration of the vehicle model 200 managed by the vehicle model database D10 will be described. FIG. 11 is a diagram illustrating an example of a configuration of the vehicle model 200. The vehicle model 200 includes a control model 210 and a plant model 220. The control model 210 simulates a control system associated with the powertrain of the virtual vehicle. The plant model 220 simulates an acceleration/deceleration operation of the virtual vehicle in response to a control signal from the control model 210. The plant model 220 includes a model of a powertrain that operates based on a control signal from the control model 210, and a model for simulating the operation of the virtual vehicle by the action of the virtual driving force output from the powertrain model. The control model 210 may also be referred to as simulating a control system that calculates a required output for the powertrain of the virtual vehicle. The plant model 220 may also be referred to as simulating physical constraints on the required output of the powertrain.

The specifications of the control model 210 and the plant model 220 differ depending on the type of the powertrain system. For example, CONV and HEV differ in the configuration of the control system, the transmission, and the drive system. Therefore, both the control model 210 and the plant model 220 differ between CONV vehicle model 200 and HEV vehicle model 200, respectively. FIG. 11 shows a case in which the virtual vehicle is an automatic transmission vehicle (AT vehicle) equipped with an internal combustion engine.

The control model 210 includes a target virtual driving force calculation unit 211 and a request output calculation unit 212. The target virtual driving force calculation unit 211 calculates a virtual driving force (target virtual driving force) required by the output of the powertrain of the virtual vehicle on the basis of the accelerator operation amount and the vehicle speed. For example, the target virtual driving force calculation unit 211 performs calculation using a map that gives the target virtual driving force to the combination of the accelerator operation amount and the vehicle speed. The request output calculation unit 212 calculates a required output for the powertrain so as to be able to satisfy the calculated target virtual driving force. The calculated required output includes the target engine torque of the internal combustion engine and the target gear stage of the transmission. The control model 210 sends the calculated request output to the plant model 220.

The plant model 220 includes an internal combustion engine model 221, a transmission model 222, a drive system model 223, and a vehicle/environment model 224. The internal combustion engine model 221, the transmission model 222, and the drive system model 223 are models of the powertrain from the drive source to the drive wheels. The vehicle/environment model 224 is a model for simulating the operation of the virtual vehicle by the action of the virtual driving force output from the powertrain model.

The internal combustion engine model 221 is a model of the internal combustion engine of the virtual vehicle. The internal combustion engine model 221 simulates, for example, the operation of the internal combustion engine with respect to the input of the target engine torque. The internal combustion engine model 221 outputs a virtual engine speed and a virtual engine torque. The parameters 201 that can be changed according to the target virtual vehicle in the internal combustion engine model 221 are, for example, engine maximum torque, engine torque responsiveness, and the like.

The transmission model 222 is a model of a transmission of a virtual vehicle. The transmission model 222 simulates, for example, the operation of the transmission with respect to the input of the target transmission stage. The transmission model 222 outputs the virtual transmission output torque from the virtual engine torque output from the internal combustion engine model 221 and the gear ratio determined by the virtual transmission stage. The transmission model 222 includes a stepped transmission model simulating a stepped transmission simulating a stepped transmission, and a continuously variable transmission model simulating a continuously variable transmission. Either the stepped transmission model or the continuously variable transmission model is selected according to the target virtual vehicle. The parameters 201 that can be changed according to the target virtual vehicle in the transmission model 222 are, for example, respective gear ratios, transmission timings, and the like. In the case of the stepped transmission model, the gear ratio means the gear ratio of each gear stage.

The drive system model 223 is a model of a drive system of the virtual vehicle. For example, the mechanical structure of the drive system model 223 from the transmission to the drive wheels is modeled. The drive system model 223 calculates the drive wheel torque using the virtual transmission output torque output from the transmission model 222 and the predetermined reduction ratio, and outputs the virtual drive force of the virtual vehicle. The parameter 201 which can be changed according to the target virtual vehicle in the drive system model 223 is, for example, a reduction ratio, a maximum allowable torque of the propeller shaft, and the like The vehicle/environment model 224 is a model representing the dynamic characteristics of the virtual vehicle and the traveling environment of the virtual vehicle. The vehicle/environment model 224 calculates the traveling resistance applied to the virtual vehicle from the traveling environment of the virtual vehicle. Then, the vehicle/environment model 224 simulates the acceleration/deceleration operation of the virtual vehicle based on the virtual driving force output from the drive system model 223, the calculated traveling resistance, and the dynamic characteristics of the virtual vehicle. The vehicle/environment model 224 outputs the virtual acceleration from the acceleration/deceleration operation of the virtual vehicle. The parameters 201 that can be changed according to the target virtual vehicle in the vehicle/environment model 224 are, for example, vehicle weight, tire diameter, CD, and the like.

As described above, the vehicle model 200 can be configured. The vehicle model 200 illustrated in FIG. 4 is an example. The vehicle model 200 may also be configured to more finely configure a portion of the model in response to an event that is desired to be emphasized. Consider, for example, a case where it is desired to emphasize a shock or a response associated with gripping of a gear and a clutch of a transmission at the time of kickdown. In this case, the transmission model 222 may be configured to finely reproduce a gear mechanism such as a planetary Lavinio of a transmission, inertia of each component, a change in a transmission path in engagement and disengagement of a clutch, and the like. On the other hand, when it is desired to reduce the computational load in the vehicle model 200, the transmission model 222 may be configured in a simple manner so as to reproduce only the gear ratio.

5 Sound Control Device

The control device 101 according to the present embodiment may function as a sound control device that controls the in-vehicle speaker 21 so as to output a pseudo-engine sound corresponding to the target virtual vehicle with respect to the control of battery electric vehicle 100. Specifically, when the processing circuit 102 executes the in-vehicle speaker control computer program 104 stored in the storage device 103, the control device 101 functions as a sound control device. Hereinafter, the control of battery electric vehicle 100 by the sound control device will be described.

Figure 12:
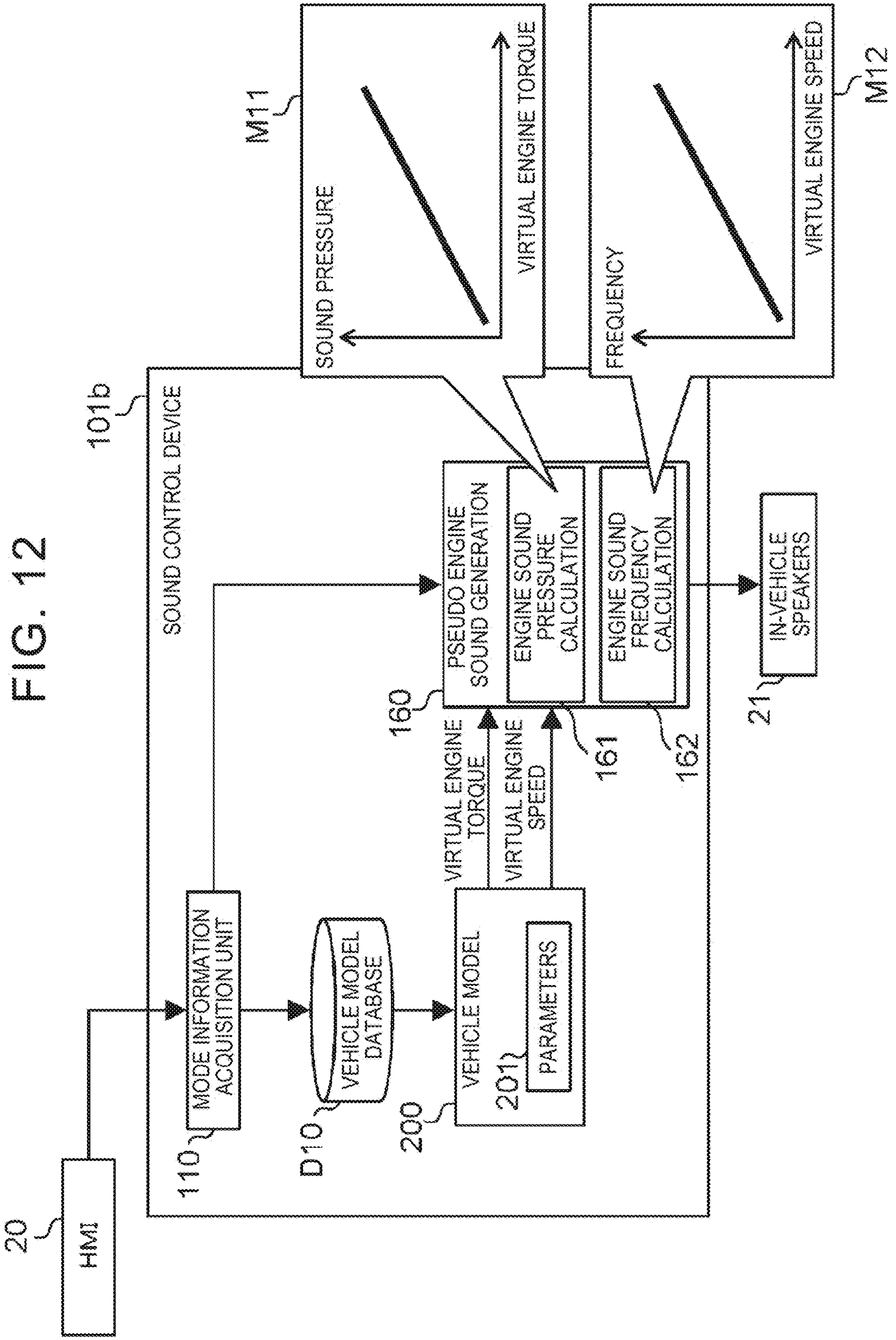
FIG. 12 is a diagram illustrating an example of a functional configuration of a control device functioning as a sound control device.

FIG. 12 is a diagram illustrating a functional configuration of the sound control device **101*b*. The sound control device 101*b* generates, from the in-vehicle speaker 21**, a simulated engine sound that simulates an engine sound in a virtual vehicle equipped with an internal combustion engine.

The mode information acquisition unit 110 transmits information on the selected control mode and information on the target virtual vehicle to the pseudo engine sound generation unit 160.

The pseudo engine sound generation unit 160 functions when the control mode is the on-demand mode and the target virtual vehicle is a virtual vehicle including an internal combustion engine. At this time, in the sound control device **101*b*, the vehicle model 200 (target vehicle model) of the target virtual vehicle is read from the vehicle model database D10 based on the information of the target virtual vehicle from the mode information acquisition unit 110. Further, the parameter 201 is set according to the target virtual vehicle. Then, the pseudo engine sound generation unit 160** generates a pseudo engine sound based on the virtual engine torque calculated using the target vehicle model and the virtual engine speed.

The pseudo engine sound generation unit 160 refers to the storage device 103 and acquires a sound source of the pseudo-engine sound related to the target virtual vehicle. The storage device 103 may store a sound source of a pseudo engine sound for each virtual vehicle including an internal combustion engine.

The pseudo engine sound generation unit 160 includes a process 161 for calculating an engine sound pressure and a process 162 for calculating an engine sound frequency. In operation 161, the sound pressure of the pseudo-engine sound is calculated from the virtual engine torque using the sound pressure map M11. The sound pressure map M11 is created such that the sound pressure increases as the virtual engine torque increases. In operation 162, the frequency of the virtual engine sound is calculated from the virtual engine speed using the frequency map M12. The frequency map M12 is created such that the higher the virtual engine speed, the higher the frequency. The virtual engine torque and the virtual engine speed are changed by the operation of the driving operation member by the driver.

The sound control device **101*b* outputs the pseudo engine sound generated by the pseudo engine sound generation unit 160 from the in-vehicle speaker 21. As described above, the sound control related to the pseudo-engine sound is performed by the sound control device 101*b***, so that when the control mode is the on-demand mode, it is possible to give the driver the reality that the target virtual vehicles are being driven.

6 Display Control Device

The control device 101 according to the present embodiment may function as a display control device that controls HMI 20 so as to display the virtual engine speed and the virtual shift stage of the target virtual vehicle when the control mode is the on-demand mode. As a result, it is possible to further give the driver a sense of reality of driving the target virtual vehicle.

7 Others

Battery electric vehicle 100 according to the above embodiment is a FF vehicle that drives front wheels by one electric motor 2. However, the technical features according to the present embodiment are also applicable to a battery electric vehicle in which two electric motors are arranged in front and rear, and each of the front wheels and the rear wheels is driven. The present disclosure is also applicable to a battery electric vehicle in which an in-wheel motor is provided in each wheel.

The technical features according to the present embodiment are not limited to the battery electric vehicle, and can be widely applied battery electric vehicles as long as the electric motor is used as a power device for traveling. For example, the technical features according to the present embodiment can be applied to a hybrid battery electric vehicle (HEV) or a plug-in hybrid battery electric vehicle (PHEV) that runs only with the driving force of an electric motor. The present disclosure is also applicable to a fuel cell battery electric vehicle (FCEV) that supplies electric energy generated by a fuel cell to an electric motor.

What is claimed is:

1. A battery electric vehicle including an electric motor as a driving source, the battery electric vehicle comprising:

a driving operation member to be used for driving the battery electric vehicle;

a processing circuit; and a storage device configured to store a database for managing a plurality of vehicle models for a plurality of virtual vehicles having different acceleration characteristics for a driving operation by a driver, wherein;

the processing circuit is configured to:

read, from the database, a target vehicle model associated with a target virtual vehicle selected from among the plurality of virtual vehicles by the driver;

set a coefficient that is a value of 1 or less according to an acceleration characteristic of the target virtual vehicle;

calculate an adjusted vehicle speed by multiplying a vehicle speed of the battery electric vehicle by an inverse of the coefficient;

calculate a virtual acceleration of the target virtual vehicle in response to an operation on the driving operation member using the target vehicle model based on an operation state of the driving operation member and the adjusted vehicle speed;

calculate an adjusted virtual acceleration by multiplying the virtual acceleration by the coefficient; and control the electric motor to bring an acceleration of the battery electric vehicle to the adjusted virtual acceleration, and if the acceleration characteristic of the target virtual vehicle exceeds an acceleration capability of the battery electric vehicle, the processing circuit sets the coefficient to the value less than 1 so that a maximum acceleration of the acceleration characteristic of the target virtual vehicle is less than a maximum acceleration capability of the battery electric vehicle.

2. The battery electric vehicle according to claim 1, wherein the processing circuit is further configured to:

if the acceleration characteristic of the target virtual vehicle exceeds the acceleration capability of the battery electric vehicle, set the coefficient to the value less than 1 so that no value of the acceleration characteristic of the target virtual vehicle exceeds the acceleration capability of the battery electric vehicle; and if no value of the acceleration characteristic of the target virtual vehicle exceeds the acceleration capability of the battery electric vehicle, set the coefficient to 1.

3. The battery electric vehicle according to claim 1, wherein the processing circuit is configured to, while the battery electric vehicle is decelerating, set the coefficient to 1 regardless of the acceleration characteristic of the target virtual vehicle.

4. The battery electric vehicle according to claim 1, wherein the processing circuit is configured to:

calculate a target driving force of the battery electric vehicle for bringing the acceleration of the battery electric vehicle to the adjusted virtual acceleration; and change a motor torque to be output by the electric motor to apply the target driving force to the battery electric vehicle.

5. A control device for a battery electric vehicle including an electric motor as a driving source, the control device comprising:

a processing circuit; and a storage device configured to store a database for managing a plurality of vehicle models for a plurality of virtual vehicles having different acceleration characteristics for a driving operation by a driver, wherein;

the battery electric vehicle includes a driving operation member to be used for driving the battery electric vehicle, the processing circuit is configured to:

read, from the database, a target vehicle model associated with a target virtual vehicle selected from among the plurality of virtual vehicles by the driver;

set a coefficient that is a value of 1 or less according to an acceleration characteristic of the target virtual vehicle;

calculate an adjusted vehicle speed by multiplying a vehicle speed of the battery electric vehicle by an inverse of the coefficient;

calculate a virtual acceleration of the target virtual vehicle in response to an operation on the driving operation member using the target vehicle model based on an operation state of the driving operation member and the adjusted vehicle speed;

calculate an adjusted virtual acceleration by multiplying the virtual acceleration by the coefficient; and control the electric motor to bring an acceleration of the battery electric vehicle to the adjusted virtual acceleration, and if the acceleration characteristic of the target virtual vehicle exceeds an acceleration capability of the battery electric vehicle, the processing circuit sets the coefficient to the value less than 1 so that a maximum acceleration of the acceleration characteristic of the target virtual vehicle is less than a maximum acceleration capability of the battery electric vehicle.

6. The battery electric vehicle according to claim 1, wherein the processing circuit is configured to calculate the coefficient by dividing the maximum acceleration capability of the battery electric vehicle by the maximum acceleration of the acceleration characteristic of the target virtual vehicle.

7. The control device for the battery electric vehicle according to claim 5, wherein the processing circuit is configured to calculate the coefficient by dividing the maximum acceleration capability of the battery electric vehicle by the maximum acceleration of the acceleration characteristic of the target virtual vehicle.

* * * * *